US 6,738,822 B2

(12) United States Patent
Fukasawa et al.

(10) Patent No.: US 6,738,822 B2
(45) Date of Patent: May 18, 2004

(54) RELAY APPARATUS, SYSTEM AND METHOD, AND STORAGE MEDIUM

(75) Inventors: Toshihiko Fukasawa, Machida (JP); Hiroshi Okazaki, Yokohama (JP); Kenichiro Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/161,812

(22) Filed: Sep. 28, 1998

(65) Prior Publication Data

US 2002/0091808 A1 Jul. 11, 2002

(30) Foreign Application Priority Data

Sep. 30, 1997 (JP) .............................................. 9-267373

(51) Int. Cl.⁷ .............................................. G06F 15/16
(52) U.S. Cl. ...................................... 709/231; 709/204
(58) Field of Search ................................ 709/223, 228, 709/227, 231, 232, 203, 204, 205; 345/740; 370/260, 261, 262, 263

(56) References Cited

U.S. PATENT DOCUMENTS 5,530,905 A * 6/1996 Nichols et al. ............. 709/227
5,548,510 A * 8/1996 Ebert et al. ................. 701/200

(List continued on next page.)

FOREIGN PATENT DOCUMENTS

| JP | 4-269087 | | 9/1992 | | |
| JP | 8-008907 | | 1/1996 | | |
| JP | 08293873 A | * | 11/1996 | ........... | H04L/12/28 |
| JP | 09-168027 A | | 6/1997 | | |
| JP | 09168027 A | * | 6/1997 | ........... | H04L/12/66 |
| JP | 9-214564 | | 8/1997 | | |

OTHER PUBLICATIONS

Turletti et al, "Videoconferencing on the Internet", IEEE, Jun. 1996, pp. 340–353.*
Amir et al, "An Application Level Video Gateway", ACM, Nov. 1995, 19 pages.*
Bisdikian et al, "The Multimedia Gateway: An evolution toward switched video services", IEEE, 1996, pp. 54–58.*
Meggers, "Providing Video Conference for the Mobile User", IEEE, 1996, pp. 526–534.*
Willebeek–LeMair et al, "On Multipoint Control Units for Videoconferencing", IEEE, 1994, pp. 356–364.*
Sharon et al, "Rate Control of VBR H.261 Video on Frame Relay Networks", IEEE, 1995, pp. 1443–1447.*
Gajewska et al, "Argo: A System for Distributed Collaboration", IEEE, 1994, pp. 433–440.*
Leung et al, "A Modular Multirate Video Distribution System—Design and Dimensioning", IEEE, 1994, pp. 549–557.*
Brookes et al, "Teaching Internet literacy to a large and diverse audience", ACM, 1997, pp. 7–15.*
Huang et al, "Modeling and Simulation of Self–Similar Variable Bit Rate Compressed Video A Unified Approach", ACM, 1995, pp. 114–125.*

(List continued on next page.)

Primary Examiner—Bunjob Jaroenchonwanit
(74) Attorney, Agent, or Firm—Morgan & Finnegan, LLP

(57) ABSTRACT

A system enables information transmission between a server which serves information by its own communication format and a client which receives service on a general network, with an efficient and simple structure. A conversion server 101 receives a video transmission request message from a client 103 in the HTTP protocol, the conversion server 101 converts the message into a message of a format of a server 102, and transmits the converted message to the server 102. Then, the conversion server 101 returns video data transferred from the server 102 to the client 103 in the HTTP protocol.

16 Claims, 10 Drawing Sheets

U.S. PATENT DOCUMENTS

| | | | | |
|---|---|---|---|---|
| 5,557,317 | A | * | 9/1996 | Nishio et al. ................. 725/92 |
| 5,579,308 | A | * | 11/1996 | Humpleman ................ 370/352 |
| 5,636,218 | A | * | 6/1997 | Ishikawa et al. ............ 370/401 |
| 5,657,246 | A | * | 8/1997 | Hogan et al. .............. 348/14.1 |
| 5,677,905 | A | * | 10/1997 | Bigham et al. ........ 370/395.21 |
| 5,724,355 | A | | 3/1998 | Bruno et al. ................ 370/401 |
| 5,740,214 | A | * | 4/1998 | Rebec et al. ................ 375/377 |
| 5,742,329 | A | * | 4/1998 | Masunaga et al. ....... 348/14.07 |
| 5,742,762 | A | * | 4/1998 | Scholl et al. ............... 709/200 |
| 5,822,537 | A | * | 10/1998 | Katseff et al. ............. 709/231 |
| 5,848,415 | A | * | 12/1998 | Guck .......................... 707/10 |
| 5,903,302 | A | * | 5/1999 | Browning et al. ....... 348/14.08 |
| 5,961,589 | A | * | 10/1999 | Hansen ...................... 709/205 |
| 5,987,100 | A | * | 11/1999 | Fortman et al. ......... 379/88.14 |
| 6,011,587 | A | * | 1/2000 | Sakazawa et al. ..... 375/240.01 |
| 6,052,750 | A | * | 4/2000 | Lea ............................. 710/72 |
| 6,067,571 | A | * | 5/2000 | Igarashi et al. ............. 709/232 |
| 6,091,951 | A | * | 7/2000 | Sturniolo et al. ........ 455/432.2 |
| 6,101,320 | A | * | 8/2000 | Schuetze et al. ............ 709/206 |
| 6,246,695 | B1 | * | 6/2001 | Seazholtz et al. ........... 370/468 |
| 6,272,151 | B1 | * | 8/2001 | Gupta et al. ................ 370/489 |
| 6,385,193 | B1 | * | 5/2002 | Civanlar et al. ............ 370/352 |
| 6,385,647 | B1 | * | 5/2002 | Willis et al. ................ 709/217 |
| 6,389,174 | B1 | * | 5/2002 | Liu et al. .................... 382/240 |
| 6,414,952 | B2 | * | 7/2002 | Foley ......................... 370/352 |
| 2002/0092028 | A1 | * | 7/2002 | Lin et al. ...................... 725/93 |

OTHER PUBLICATIONS

Lawhead et al, "The Web and distance learing: what is appropriate and what is not", ACM, 1997, pp. 27–37.*

Shin'ya Amano, et al., "SmartStreamer: Multimedia Server for Consumer Computing Era," Toshiba Review, vol. 51, No. 1, 1996, pp. 26–29, and English Translation.

Office Action dated May 12, 2003, in counterpart Japanese Application No. 9–267373.

* cited by examiner

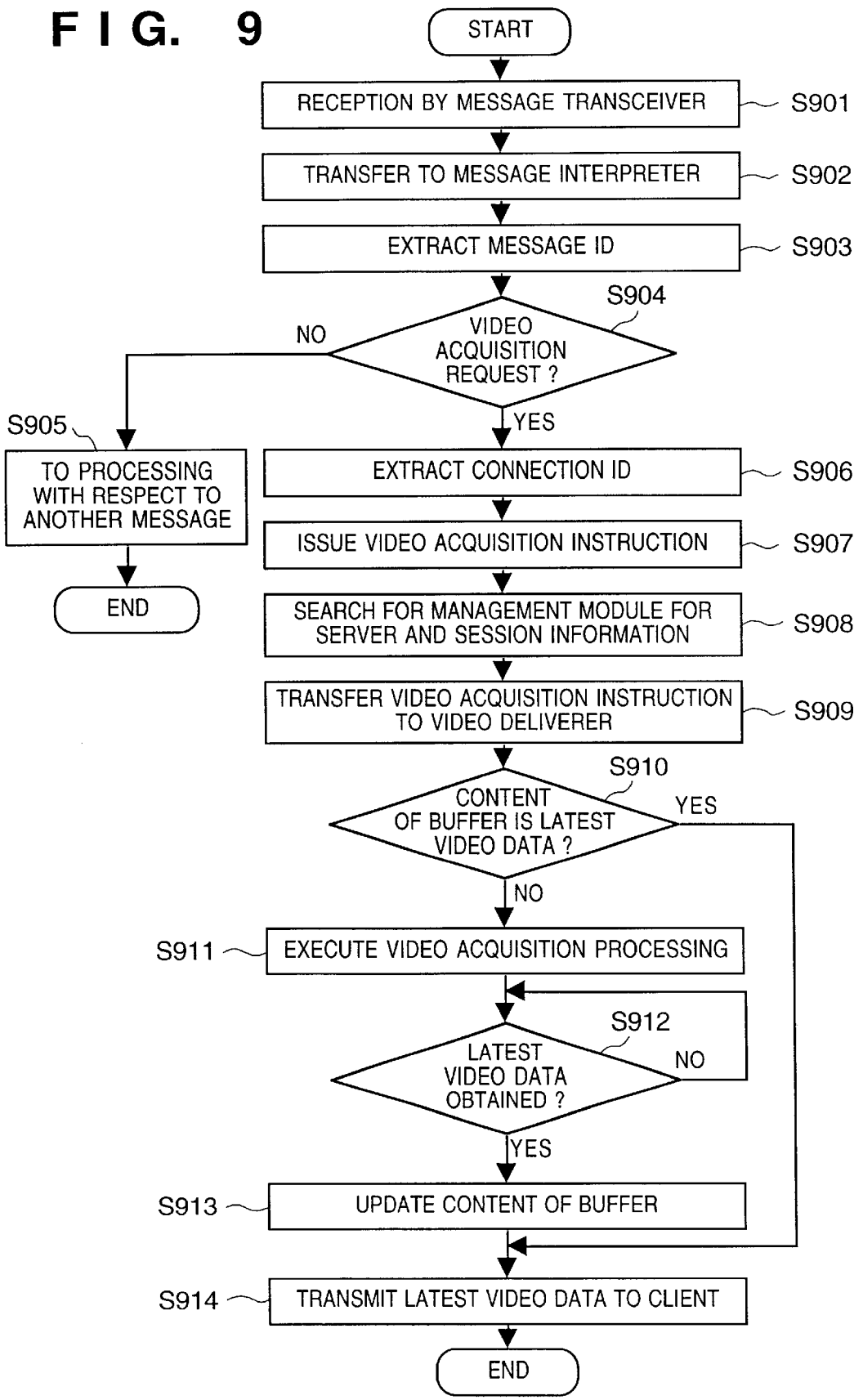

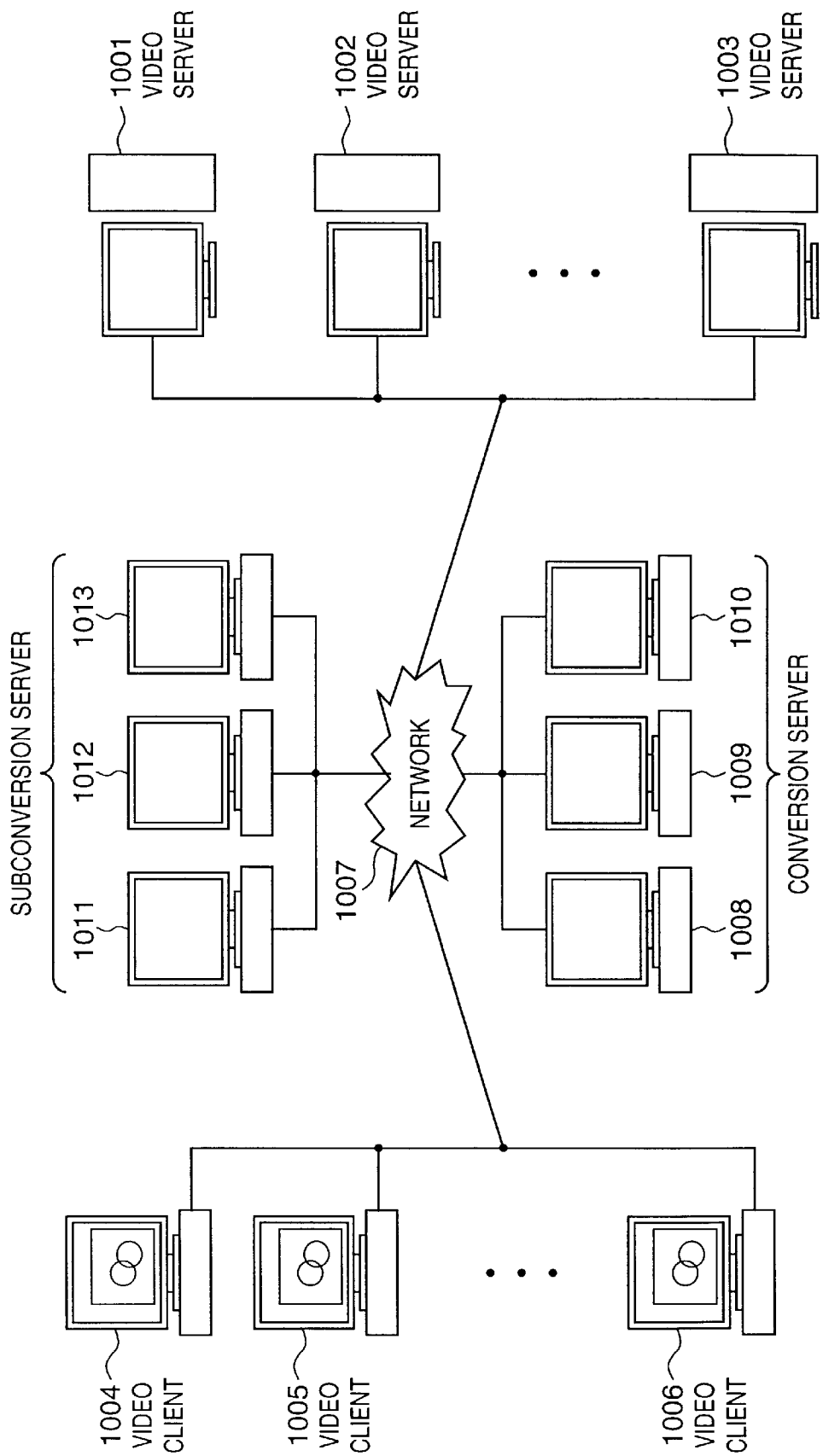

RELAY APPARATUS, SYSTEM AND METHOD, AND STORAGE MEDIUM

BACKGROUND OF THE INVENTION

The present invention relates to a relay apparatus, system and method and storage medium, and more particularly, to a relay apparatus, system and method and storage medium for information services by a server on a network to a client.

With high-speed and wide area Internet and Intranet environment, network application programs (application programs which run on a computer network as a platform), which conventionally handled only text data, handle multimedia data such as video and audio data having more complicated structure and requiring a larger capacity.

In this progress, the assignee of the present invention has proposed a network application program for providing a user with a video image obtained by a video recorder or video camera as a still image or moving image from a server program located at a remote place via a network.

Hereinafter, the above network application program will be referred to as a "video delivery system".

On the other hand, as World Wide Web browsers (hereinafter simply referred to as "Web browsers" or "browsers") such as Netscape Navigator (by Netscape Communications Corporation) and Internet Explorer (by Microsoft Corporation) became popular, the computer network, that has been utilized as conventional communication means only for E-mail, news service and FTP (File Transfer Protocol) and the like, is developing as the field of more various activities such as collection of information and cooperative shopping.

Accordingly, the Web browsers have been improved so as to provide not only multimedia information display but also a general user interface for various purposes. The introduction of HTML (Hypertext Markup Language), HTTP (Hypertext Transfer Protocol), JavaScript, Java and the like and rapid improvement of their functions show this tendency.

The above-described development of the Web browsers has produced a need to utilize a video delivery system in the Web system by a Web browser.

However, the video delivery system proposed by the present assignee merely uses a special-purpose client application program (referred to as a "video display client"). The special-purpose video display client is started from a Web browser. Accordingly, it is not integrated with the Web browser.

Further, it is possible to seemingly incorporate the above video display client in the Web browser by using a technique such as Plug-in module. However, the video display client is still an independent program in the Web browser, therefore, the high freedom of design owned by the Web browser cannot be utilized. From a home page designer's standpoint, even look & feel and user interface of the video client should be changed in accordance with his/her preference or purpose. However, this need is not satisfied.

From the above-described situation, there is a need for a video display client integrated with a Web browser, which can be used by a Web-browser extensible language such as Java (by Sun Microsystems, Inc.) or JavaScript, or generated by using such language.

However, to satisfy this requirement, it is necessary to solve the following problems:

1. Absorption of difference between communication methods
2. Prevention of reduction in execution efficiency
3. Absorption of difference in video delivery format Hereinbelow, these problems will be described.

1. Absorption of Difference between Communication Methods

The basic operation of a Web browser is to transfer a file acquisition request message to a Web server, and to display data received as a reply to the request, on the premise that the data is sent in 1:1 correspondence with the request from the Web browser (client). Further, the Web browser must establish a communication path (hereinafter referred to as a "connection") for each request to the Web server.

In the video delivery system, a server and a client first establish a connection therebetween, and then video information is transmitted in a one-way manner from the server. To remove this difference between these two communication methods as above, means for mediating from one communication method to the other communication method is required.

2. Prevention of Reduction in Execution Efficiency

If the video display client (Web-version video client) is integrated with a Web browser, the execution efficiency of the video display function and other functions will be reduced in comparison with the special-purpose video display client.

In use of the special-purpose video client, it is possible to specify the client in correspondence with the target data structure and a video delivery protocol and to optimize the operation of the client for the purpose. On the other hand, in use of the Web-version client, general data processing and data display functions provided by the Web browser must be used. Nevertheless, the Web-version client will be utilized by more users than those of the special-purpose client, since the users can use the Web-version client without labor of download and installation and therefore the Web-version client can be easily used in comparison with the special-purpose client. However, the Web-version client with low performance might lose the reputation of the video delivery system. For this reason, means for preventing the reduction in execution efficiency must be introduced.

3. Absorption of Difference in Video Delivery Format

Preferably, the above requirements 1 and 2 should be satisfied as requirements to the Web-version video client, and further, the Web-version video client should be independent of specific video delivery system and video delivery method. In the Web-version video client using Java or JavaScript, as a viewer (a video display portion) is realized as a common user interface on the Web browser, video information should be displayed regardless of the difference in type of server (video server) which delivers the video image, as normal image data can be displayed regardless of its data format such as GIF and JPEG. To meet this requirement, it is necessary to provide means for absorbing the difference in video delivery format.

SUMMARY OF THE INVENTION

The present invention has been made in consideration of the above situation, and has its object to provide a relay apparatus, system and method and storage medium to solve the all or at least one of the above problems and enable information transmission between a server which serves information in its own communication format and a client which uses the information service on a general network, with an efficient and simple construction.

The foregoing object is attained by providing a relay apparatus for transferring information from at least one server to at least one client via a network, the server performing stream information service in its own information transmission format, the apparatus comprising: first communication means for performing communication with the client in a communication method in correspondence with the client; second communication means for performing communication with the server in a communication method in correspondence with the server; first conversion means for converting a request message to the server, received via the first communication means from the client, to a request message for the server; and second conversion means for converting information, received via the second communication means from the server, to information in a format for the client.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a flowchart showing the operation of the video acquisition processing according to the second embodiment;

FIG. 10 is a schematic diagram showing the connection relation of the apparatuses in the system according to the second embodiment.

DETAILED DESCRIPTION OF THE PREFERRED EMBODIMENTS

Hereinbelow, embodiments of the present invention will now be described in detail in accordance with the accompanying drawings.

First, prior to description of the details, the outline of embodiments will be described.

In the embodiments, the above-described three problems are solved by preparing the following function means:
    substitutional execution means for executing a function of a special-purpose client;
    efficiency promotion means for efficiently enabling the substitutional execution means; and
    delivery-method switching & execution means in correspondence with plural types of video delivery methods.

The above means will be described in detail below.

Substitutional Execution Means

The substitutional execution means includes message transmission/reception means for transmitting/receiving a message from another program, message interpretation means for interpreting the message, and connection management means for managing connection with a client.

Efficiency Promotion Means

The efficiency promotion means includes video delivery means for delivering video data obtained from a video server to a plurality of clients, and information delivery means for delivering various information such as server status obtained from a video server to a plurality of clients.

Delivery-method Switching & Execution Means

The delivery method switching & execution means includes delivery-method switching means for switching the method for transmitting a request message and a reply in accordance with the video server, and delivery-method execution means for executing issuance of a request message and a reply in accordance with a video server.

First Embodiment

Hereinbelow, an example to realize the above respective means will be described as a first embodiment.

note that in the present embodiment, the respective elements are realized as a server program independent of the video server and video client. The independent server program (a program which runs on a server device) will be referred to as a "conversion server".

Figure 2:
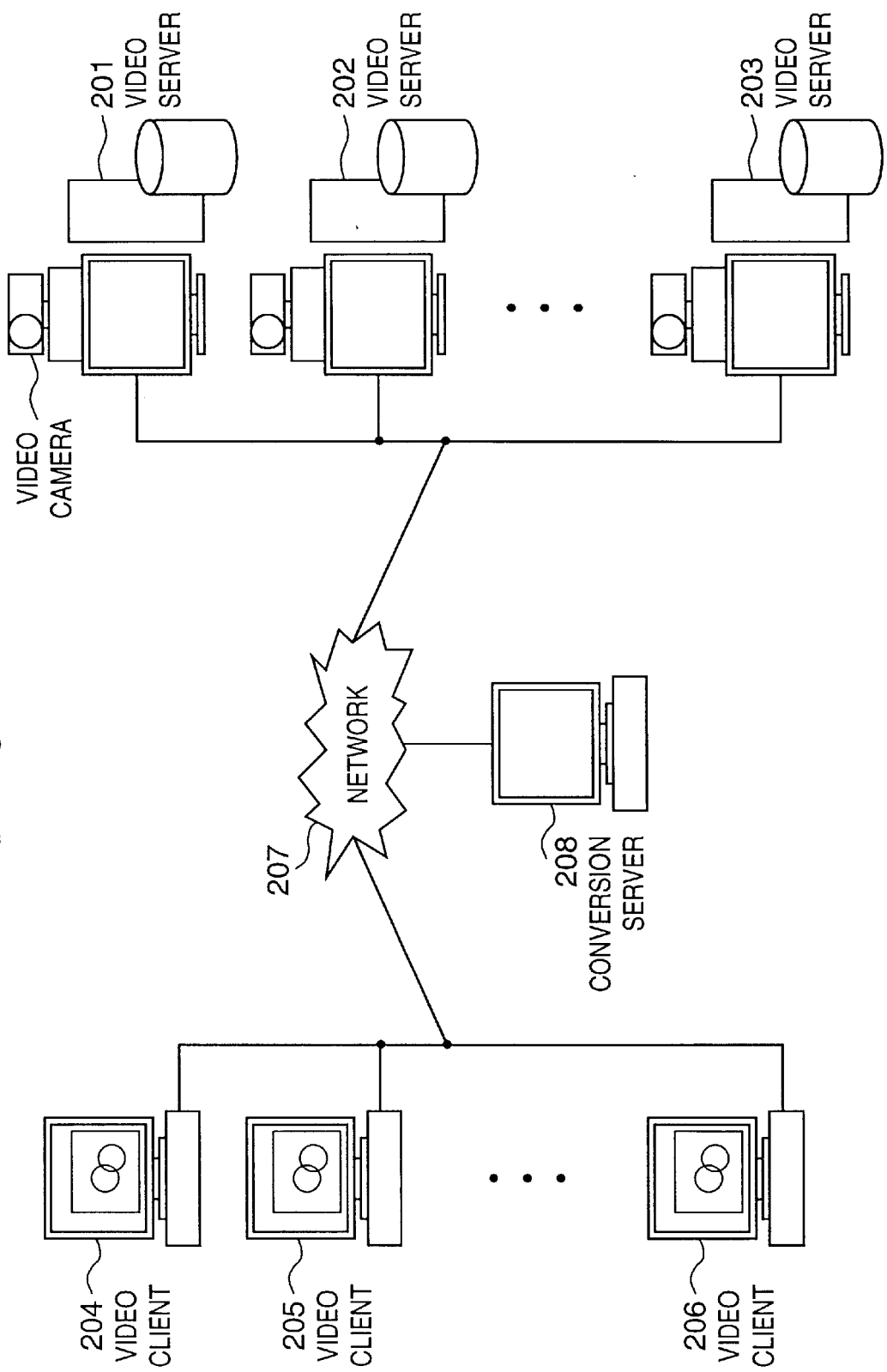
FIG. 2 is a schematic diagram showing the connection relation of apparatuses in the system of the first embodiment.

First, the outline of the operation of the conversion server will be described with reference to FIG. 2. Video servers 201 to 203 are programs which operate on, e.g., a general-purpose device such as a personal computer. Each general-purpose device is connected to a storage device containing video information and a video camera for obtaining a live video image. If the video information is required, the server delivers video information onto a network 207. Further, video clients 204 to 206 operate on a device such as a personal computer. Each video client is started by a user, then functions as a client, receives video data and displays the video data.

In the video delivery system which has been proposed by the present assignee, the video server and the video client perform communication via the network 207 to perform services. For example, when the video client 204 makes a connection with the video server 201 and transmits a video acquisition request message, the video server 201 starts transmission of video data to the video client 204. The video client 204 displays the received video data on a display or the like.

In the present embodiment, a conversion server 208 is provided between the video servers and the video clients. The conversion server 208 converts video data transmitted from the video servers 201 to 203 via the network 207 into an HTTP message (HTTP is described in detailed in RFC (Request For Comments)1945) then transmits the message to all or any of the video clients 204 to 206.

The basic operation of the present embodiment using the conversion server 208 is as follows.

First, the video acquisition request from the video client 204 is transmitted to the conversion server 208 in place of the video server 201. The video acquisition request is transmitted in HTTP message format. The conversion server 208 converts the HTTP message into a message of a format unique to the video server 201. The converted video acquisition request message is transferred to the video server 201, and the video server 201 performs processing in accordance with the request. For example, if the video server is "VDOLive", the video server starts to output a video stream, or if the video server is "WebView/Livescope" (a trademark by Canon Kabushiki Kaisha), the video server transmits video data for only one frame.

The result of processing by the video server is transmitted in the data format of Motion JPEG, MPEG or the like, to the conversion server 208. The conversion server 208 converts the video data into an HTTP message and sends the message to the video client 204. Note that the conversion to HTTP is made by adding information on data type, data size, date and the like to the original data.

Next, the respective elements of the conversion server will be described with reference to FIG. 1.

Figure 1:
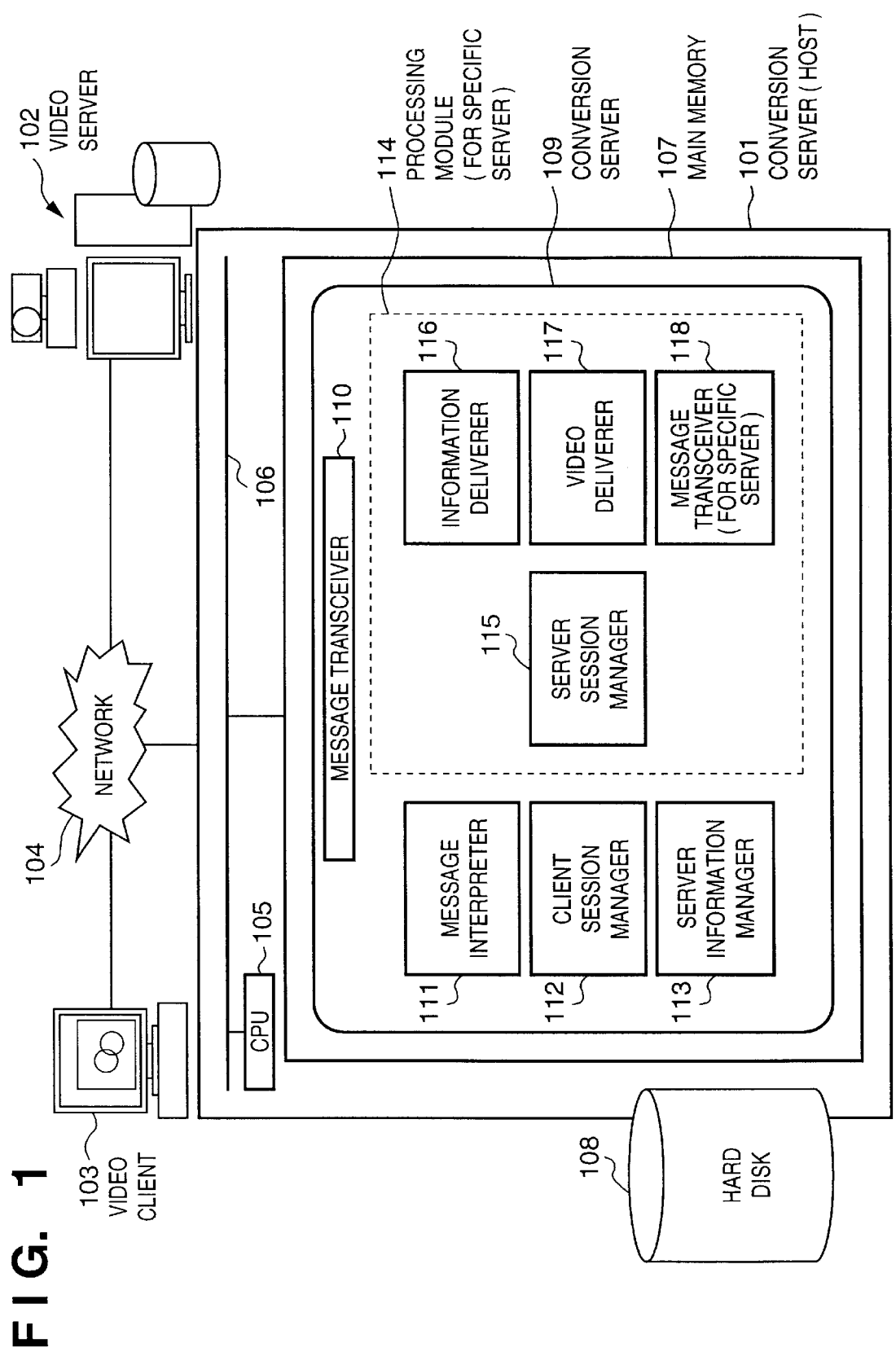
FIG. 1 is a block diagram showing the construction of a system according to a first embodiment of the present invention.

In FIG. 1, programs, which function as the conversion server, the video server and the video client, operate on three computers 101 to 103. The computers 101 to 103 are interconnected via a network 104 and can mutually transmit/receive a message. FIG. 1 only shows one video client and one video server, however, actually, a plurality of video clients and video servers are used as shown in FIG. 2. Further, the number of the video servers and that of the video clients do not pose any limitation on the present invention.

The computer 101 is provided with a secondary storage device such as a hard disk 108 for storing various program files of the conversion server. Further, the computer 101 includes a CPU 105 for actually performing the processing by the conversion server and a main memory 107 for holding an execution image (a program code and various data and table and the like used in the conversion) by the conversion server 109. The CPU 105 and the main memory 107 are connected via a bus 106.

A conversion server 109 consists of a group of software modules as follows. Note that "software module" means a set of data, a series of procedures and a group of functions generated by a program language such as C and C++. The software module has a function or procedure as an interface for cooperation with another software module. The interfacing function or procedure is referred to as an "entry point" here. To call another module, it is necessary to somehow obtain the memory address of the entry point of the module to be called. Generally, the address information of an entry point can be obtained upon compilation or linkage time.

The Software Modules a message transceiver 110 a message interpreter 111 a client session manager 112 a server information manager 113

Further, the conversion server 109 includes a processing module 114 corresponding to the type of a specific video server to communicate with the conversion server 109. Although FIG. 2 shows only one processing module 114, however, actually, a plurality of processing modules for plurality of servers may be provided.

The processing module 114 performs processing regarding the communication method or message format unique to the specific video server to communicate with the conversion server 109. The processing module 114 further includes the following submodules:

a server session manager 115 an information deliverer 116 a video deliverer 117 a message transceiver 118 for the specific server

Next, the outline of the modules and submodules 110 to 118 will be described.

Message Transceiver 110

The message transceiver 110 provides other module and submodule with means for receiving a message transmitted from the video server 102 and the video client 103 via the network 104. Further, the message transceiver 110 provides other module and submodule with means for transmitting a reply message or the like to the video server 102 and the video client 103.

The message transceiver is realized by utilizing a general interprocess communication protocol, TCP (Transmission Control Protocol) or UDP (User Datagram Protocol) or the like using a socket or the like. Note that some type of video server requires a specific communication method or protocol such as RTP (Realtime Transfer Protocol). For such video server, a message transceiver 118 for the server is added to the processing module 114, and the function of the message transceiver 118 is utilized. The message transceiver 110 is used for communication with the video client 103 or communication with a video server which does not require a specific communication method.

Note that the present Web browser performs communication based on the HTTP protocol on the TCP protocol, however, a different communication method might be employed in the future. In such case, a "message transceiver" for a specific video client in correspondence with the type of the client can be prepared. The message transceiver for the client can be realized and controlled in the same way as that for the message transceiver for the server.

Message Interpreter 111

The message interpreter 111 interprets various messages (hereinafter referred to as "requests" or "request messages") transmitted from a video client and instructs other modules to perform corresponding processing. Each request message includes a message ID to discriminate the request type. The messages interpreted by the message interpreter 111 are:

a session start request a session termination request a video acquisition request an information acquisition request The respective requests will be described later.

Client Session Manager 112

The client session manager 112 provides means for "absorbing difference between communication methods" as described above. More specifically, for obtaining correspondence between connection with the video client 103, disconnected for each communication, and connection with the video server 102, maintained by the end of service, the client session manager 112 allots a unique ID number to each video client upon the first connection establishment between the video client and the conversion server. Thereafter, when the video client sends a request to the conversion server 101, the ID number (connection ID) is added to the request. By this arrangement, even though the connection between the video client and the video server is disconnected for each communication, the correspondence between the video server that transmits video data and the video client that receives the video data can be maintained. The connection ID can be regarded as virtual connection which continues between the video client 103 and the conversion server 101. This virtual connection will be called a "session".

The above processing can be easily realized by managing the correspondence between the connection ID's and corresponding video servers in the form of a table.

Server Information Manager 113

The server information manager 113 is a module to manage entry points to the processing module(s) 114. For example, regarding a session start request from the video client 103, the server information manager 113 searches for an entry point of a necessary processing module for a specific server, with the type information of the specific video server added to the request as a key. Thus, the obtained processing module takes over the control, to execute actual processing such as session starting processing.

The above processing by the server information manager 113 can be realized by using a table containing entry points to processing modules as its values, with video-server type information (for example, a character string such as "WebView/Livescope Ver1.10") as a key.

Further, in a case where the conversion server is realized on an OS providing dynamic link means, the processing modules may be provided as files apart from the conversion server, and necessary processing module(s) may be automatically read when starting the conversion server. The server information manager 113 also has this function. Note that this processing is not essential in the present invention. In the present embodiment, the conversion server includes necessary processing module(s) in advance.

Server Session Manager 115

When the conversion server 109 receives a session start request and a session termination request from the video client 103, the server session manager 115 generates session-start and session-termination request messages unique to the video server (102 in FIG. 1), and execute session starting processing and session terminating processing to start and terminate the session with the video server.

Note that the server session manager 115 establishes only one connection (hereinafter the connection with the video server will be referred to as a "server session") even if a plurality of video clients send a session start request to the same video server. When the server session manager 115 receives a session start request, it first checks whether or not a requested server session with a corresponding video server has been established already. If the server session has not been established yet, the server session manager 115 newly establishes a server session with the video server.

Note that if video transfer requests to one video server are received from a plurality of clients, the conversion server perform mediation and transmit video data from the video server to the respective clients.

Video Deliverer 117

When the video deliverer 117 receives a video acquisition request from the video client 103, it issues a video acquisition request for the video server 102, and obtains latest video data from the video server 102. Note that if the video server periodically transmits video information, the video deliverer 117 obtains latest video data without issuing video acquisition request.

The obtained video data is stored in a video buffer in the video deliverer 117. Regarding video acquisition requests from a plurality of video clients "approximately simultaneously received" by the conversion server 109, the video data in the video buffer can be transmitted to the video clients. In this manner, the number of communications with the video server can be reduced, and the execution efficiency can be improved.

Note that to process the "approximately simultaneously received" video acquisition requests, (1) requests arrived within a predetermined period are regarded as simultaneously arrived requests; or
(2) all the requests arrived from the start to the end of video acquisition request processing are regarded as simultaneously arrived requests. In the present embodiment, a client that issues a video acquisition request at the highest speed is used as a reference client. In this method, during a period between the point where the client 1 issues a video acquisition request (request 1) to the point where the client 1 issues the next video acquisition request (request 2), video acquisition requests sent from other clients are regarded as "approximately simultaneously received", and video data in the video buffer obtained from the video server by the request 1 is transmitted to the clients.

Information Deliverer 116

The video server, proposed by the present assignee, to serve video images obtained by a camera provides means for obtaining not only video data but also information on the status of the video server or information on the network 104. The video client obtains necessary information by issuing an information acquisition request to the video server.

Further, some type of video servers have a function to automatically notify their server status even if the video client does not issue any request. For example, the server WebView/Livescope for operation of a remote video camera, automatically notifies every change in the direction and zooming of the camera to all the video clients. As the server information or notification information is common to the plurality of video clients, buffering similar to that of video data is performed.

The information deliverer 116 performs acquisition of server information and notification information from a video server and delivery processing by buffering. Especially, regarding a video server having a notification function, information once stored in the buffer is effective until a new change is notified from the video server. In this case, information requests from the video clients, received during a period from a point where the server information is stored into the buffer to a point where new server information is stored into the buffer, can be processed very quickly without inquiring of the server.

Message Transceiver 118

The message transceiver 118 is a transmission/reception module for a specific server. The message transceiver 118 has the same has a function similar to that of the server message transceiver 110. Further, if the processing module 114 does not require a transmission/reception module for a specific server, the message transceiver 118 is realized as a module to call the function of the server message transceiver 110.

Next, a communication protocol between the video client 103 and the conversion server 109 will be briefly described. the video client 103 transmits the following requests to the conversion server 109 to cause the conversion server to perform necessary processing.

Session operation
   OpenCameraServer
   CloseCameraServer

Image acquisition
   GetLiveImage

Information acquisition
   GetNotice
   GetVideoInfo

Camera operation
  OperateCamera
  GetCameraControl
  GetCameraInfo

The respective requests are based on the HTTP 1.0. protocol these requests are transmitted as GET commands generated from URL (Universal Resource Locator) format data to be described later to the conversion server. (Note that the HTTP 1.0 protocol, URL's, and the conversion from a URL to a GET command are explained in detail in the RFC 1945).

In the present embodiment, the HTTP protocol is not necessarily used as a protocol between the video client and the video server, but a specific message method or protocol may be used. However, in such case, the video client might not be realized by a general function of the Web viewer. In use of FTP, SMTP (Simple Mail Transfer Protocol) and the like, the above problem does not occur, therefore, these protocols can be employed for the HTTP protocol. In this case, necessary processing can also be realized by the following method. Hereinbelow, the purpose of the respective requests and URL formats of the requests, and the formats of replies to the requests will be given.

OpenCameraServer

[Purpose] To start session with a video server [Format]
  http://<host name of conversion server>:<port number>/OpenCameraServer?
  vc_host=<host name of video server>&
  vc_host=<port number of video server>&
  server_type=<type of video server>

If information on the video server is necessary besides the above information (host name of video server, port number and type of video server), arbitrary information in the following format may be added.
  <name of additional information>=<value of additional information>

EXAMPLE cc_host=<host name of camera control server>
  [Reply] If processing was successful, a connection ID is returned to the video client in the following format.
  HTTP/1.0 200 OK
  <additional information such as data type, date and data size>
  connection_id=<connection ID>

CloseCameraServer
  [Purpose] To terminate session with a video server.
  [Format]
  http://<host name of conversion server>:<port number>/CloseCameraServer?
  connection_id=<connection ID>
  [Reply] If processing was successful, a character string "OK" is returned.

GetLiveImage
  [Purpose] To request acquisition of video data.
  [Format]
  http://<host name of conversion server>:<port number>/GetLiveImage?
  connection_id=<connection ID>&
  frame_count=<number of frames>

At frame_count, an integer "1" or greater is set. The client can receive video data for the designated number of frames.

[Reply] Video data for the designated number (set at frame_count) is returned. Note that the format of reply in a case where the number of frames is "1" is somewhat different from that in a case where the number of frames is "2" since video data for two or more frames is transmitted by the Serverpush format (described in detail in the RFC 1945).

A. In a case where the number of frames is "1"
  HTTP/1.0 200 OK
  <additional information such as data type, date and data size>
  <video information>

B. In a case where the number of frames is "2" or greater
  HTTP/1.0 200 OK
  <additional information such as data type, date and data size>
  Content-type:multipart/x-mixed
  replace;boundary=JointServerImage——
    JointServerImage
  Content-Length:<data length for 1 frame>
  Content-type:<data type for 1 frame>
  <video information for 1 frame>
  ——JointServerImage
  . . .
  . . .
  ——JointServerImage——

GetNotice
  [Purpose] To obtain content of latest notification from video server.
  [Format]
  http://<host name of conversion server>:<port number>/GetNotice?
  commenction_id=<connection ID>
  [Reply] Only if the video server as the destination of server session has a function to automatically transmit a notification message, a reply in the following format can be obtained.
  HTTP/1.0 200 OK
  <additional information such as data type, date and data size>
  . . .
  <name of information>=<value of information>
  . . .

For example, in case of WebView/Livescope, as the change in the direction of a video camera is notified from the video server, the following reply can be obtained:
  HTTP/1.0 200 OK
  . . .
  pan=<horizontal direction of video camera>
  tilt=<vertical direction of video camera>
  zoom=<zooming>

The information obtained as above differs depending on the type of video server.

GetvideoInfo
  [Purpose] To obtain video related information
  [Format]
  http://<host name of conversion server>:<port number>/GetVideoInfo?
  connection_id=<connection ID>
  [Reply] Although the type of information differs depending on the type of video server, information in the following format is returned.

HTTP/1.0 200 OK
<additional information such as data type, date and data size>
...
<name of information>=<value of information>
...

In a general video server, the following information can be obtained:
image_width=<lateral length of video data>
image_height=<vertical length of video data>
compression_type=<compression method for video data>
frame_rate=<frame rate>

GetCameraInfo
[Purpose] To obtain video-camera related information.
[Format]
http://<host name of conversion server>:<port number>/GetCameraInfo?
connection_id=<connection ID>
[Reply] Only if the video server can remote-operate a video camera, a reply in the following format can be obtained.
HTTP/1.0 200 OK
<additional information such as data type, date and data size>
...
<name of information>=<value of information>
...

For example, in case of WebView/Livescope, as the change in the direction of a video camera is notified from a video server, the following reply can be obtained.
HTTP/1.0 200 OK
...
pan_left_limit=<operation limit in leftward direction>
pan_right_limit=<operation limit in rightward direction>
pan_current_value=<current position in horizontal direction>
tilt_up_limit=<limit in upward direction>
tilt_down_limit=<limit in downward direction>
tilt_current_value=<current position in vertical direction>
zoom_wide_limit=<limit of zooming>
zoom_tele_limit=<limit of zooming>
zoom_current_value=<zoom current value>

GetCameraControl
[Purpose] To request camera control right.
[Format]
http://<host name of conversion server>:<port number>/GetCameraControl?
connection_id=<connection ID>
[Reply] Only if the video server can remote-operate a video camera, a character string OK can be received.

OperateCamera
[Purpose] To request video camera operation.
[Format]
http://<host name of conversion server>:<port number>/OperateCamera?
connection_id=<connection ID>&
pan=<designation of horizontal direction>&
tilt=<designation of vertical direction>&
zoom=<designation of zooming>
[Reply] Only if the video server can remote-operate a video camera, a character string "OK" can be received.

Next, the flow from the start to the end of session between the video client and the conversion server by using the above-described requests will be described. The flow divides into the following five phases.

1. Start of session
2. Acquisition of video data
3. Acquisition of information
4. Camera operation
5. Termination of session Note that the "camera operation" phase is available only in a session with a camera-operating video server such as WebView/Livescope.

1. Start of Session
When the video client transmits the OpenCameraServer request to the conversion server, a session with the video server starts. As a reply to the OpenCameraServer request, a connection ID allotted to the video client is returned. The connection ID is used in all the subsequent requests.

2. Acquisition of Video Data
When the video client transmits the GetLiveImage request to the conversion server, the video client can obtain video data as a reply to the request.

3. Acquisition of Information
When the video client transmits the GetVideoInfo request to the conversion server, the video client can obtain information on video size, frame rate and the like, as a reply to the request.

4. Camera Operation
Camera operation is made by the following procedure. First, the video client requests a camera operation right by the GetCameraControl request. If the video client obtains the camera operation right, the video client sends the OperateCamera request to the conversion server, and operates the camera.

Note that the camera operation right, i.e., a right to change a camera angle (pan angle, tilt angle, zooming and the like) is owned by only one client for each camera (except a case where a plurality of cameras are connected to a video server). The camera operation right is provided in several methods already proposed by the present assignee. In this embodiment, the operation right is provided to a first-connected client for a predetermined period, prior to other clients.

5. Termination of Session
When the video client transmits the CloseCameraServer request to the conversion server, the conversion server terminates the session with the video server used by the client, and invalidates the connection ID. To obtain video data again, the video client must issue the OpenCameraServer request again to establish connection.

Next, the operations of the respective elements in the basic operation of the conversion server will be described.

Figure 3:
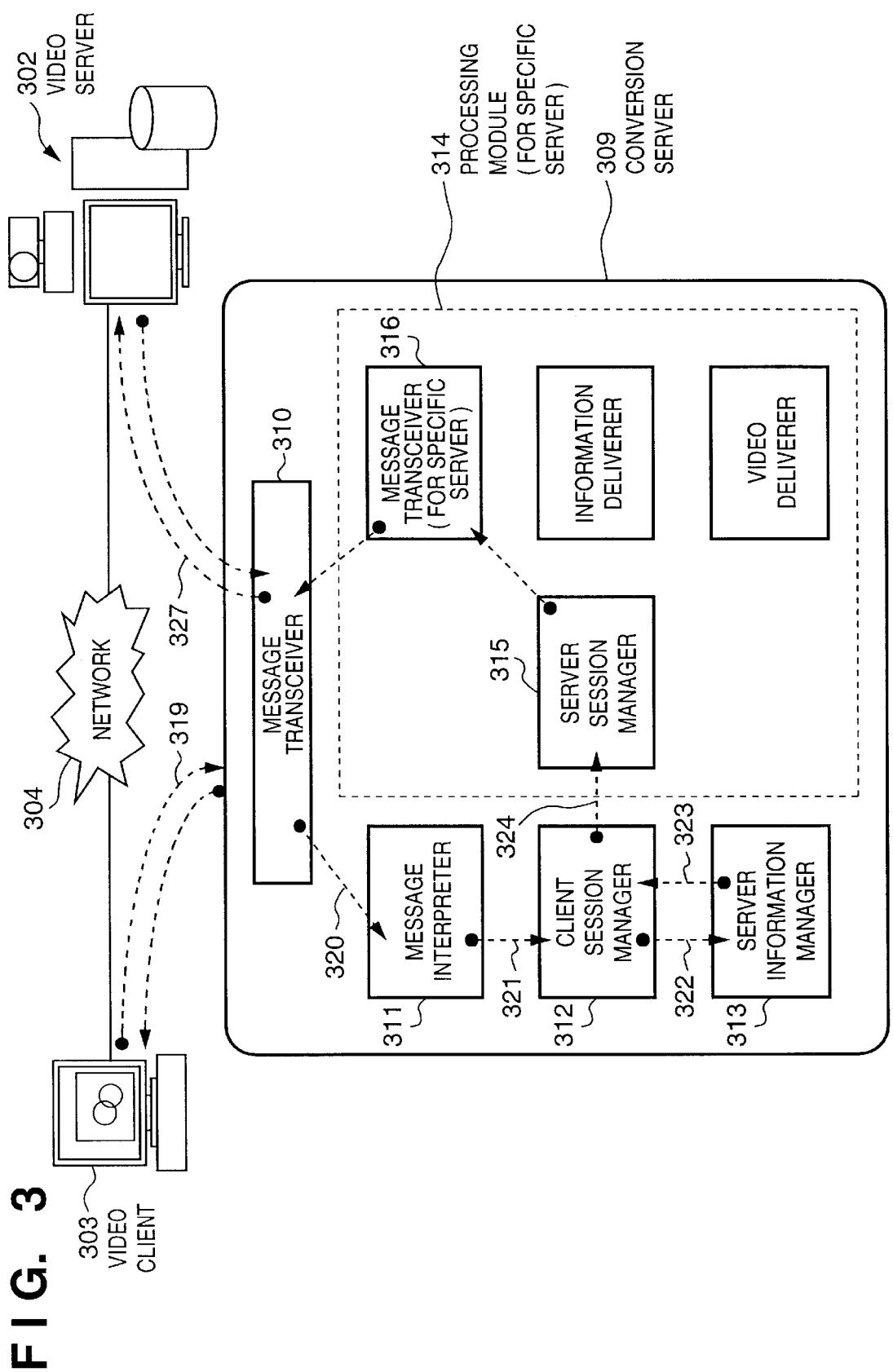
FIG. 3 is a block diagram explaining the operation of session starting processing according to the first embodiment.
Figure 7:
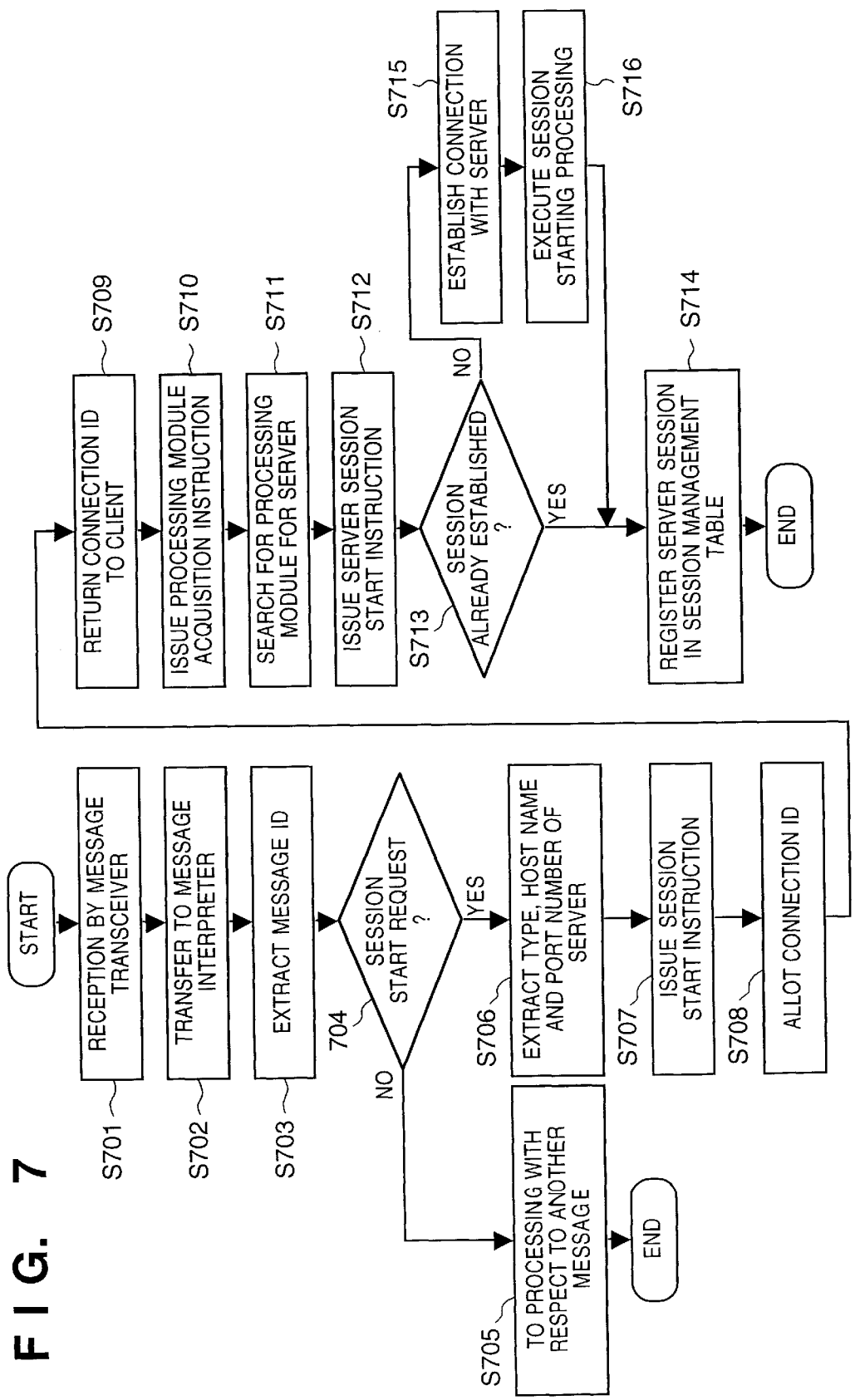
FIG. 7 is a flowchart showing the operation procedure of the session starting processing according to the second embodiment.

1. Start of Session
First, the session starting processing will be described with reference to FIG. 3 showing the concept of operation and the flowchart of FIG. 7.

When a video client 303 transmits the session start request (OpenCameraServer, 319) and a message transceiver 310 receives the request (step S701), the received request is transferred to a message interpreter 311 (step S702). The message interpreter 311 extracts a message ID from the transferred session start request 320 (step S703).

The message ID in the present embodiment is a request name portion of a request except a parameter portion. In the session start request, the message ID is the character string "OpenCameraServer". The message interpreter 311 compares a group of messages pre-stored in a hard disk or the like with the received message name, and determines what request has been transmitted. As a result, if the request is not a session start request (step S704), processing with respect to another request is performed (step S705).

If the received request is a session start request (step S704), the type, host name and port number of server, added as parameters to the session start request are extracted from the request. If additional information unique to a specific video server is added to the request, that portion is also extracted as a pair of parameter name and value (step S706).

Next, the message interpreter 311 issues a session start instruction (or command) (321) to a client session manager 312 (step S707). The extracted parameters are added to the session start instruction. The session start instruction (321) is realized by a message in an object-oriented language such as C++.

The client session manager 312 receives the session start instruction (321), then first allots a connection ID to the video client 303 (step S708). The connection ID is an integer "1" or greater, and the value of the connection ID is incremented for each allotment (other methods may be employed as long as a unique ID is allotted to each client). The allotted connection ID is transmitted via the message transceiver 310 to the video client (step S709). Further, the client session manager 312 issues a processing module acquisition instruction (322) to the server information manager 313 (step S710).

The server information manager 313 searches a table pre-stored in a storage device for a processing module for the server (302 in FIG. 3), with the server type information added to the processing-module acquisition instruction (322) as a key (step S711). The entry point of the processing module obtained as a result of search is notified as a reply (323) to the processing-module acquisition instruction to the client session manager 312.

Next, the client session manager 312 issues an instruction to establish a session with the server (server session start instruction, 324) via the entry point of the obtained processing module 314 to a server session manager 315 (step S712). The server session manager 315 receives the server session formation instruction (324), extracts the host name, the port number of the server and other specific additional information added to the instruction (324), searches its internal management table with these information as keys, and checks whether or not a session with the server has been established already. If the session has been established (step S713), the server session manager 315 returns the address of the session (more exactly, data structure representing the session) to the client session manager 312. The client session manager 312 adds the obtained session information to the entry in the management table obtained with the connection ID as the key (step S714).

Further, if the session has not been established yet (step S713), the server session manager 315 executes server-session starting processing including establishment of connection with the video server 302 (step S715) and transmission of a session start request message (327) to the video server 302 (step S716), by using the server message transceiver 316. When the session with the video server 302 is started, the information on the session (mainly including information necessary for communication with the video server such as socket) is collected and server session information is generated, and the information is returned to the client session manager 312. The client session manager 312 adds the received session information to the entry with the connection ID as the key in the internal management table.

Then, the session starting processing ends.

2. Termination of Session

Figure 4:
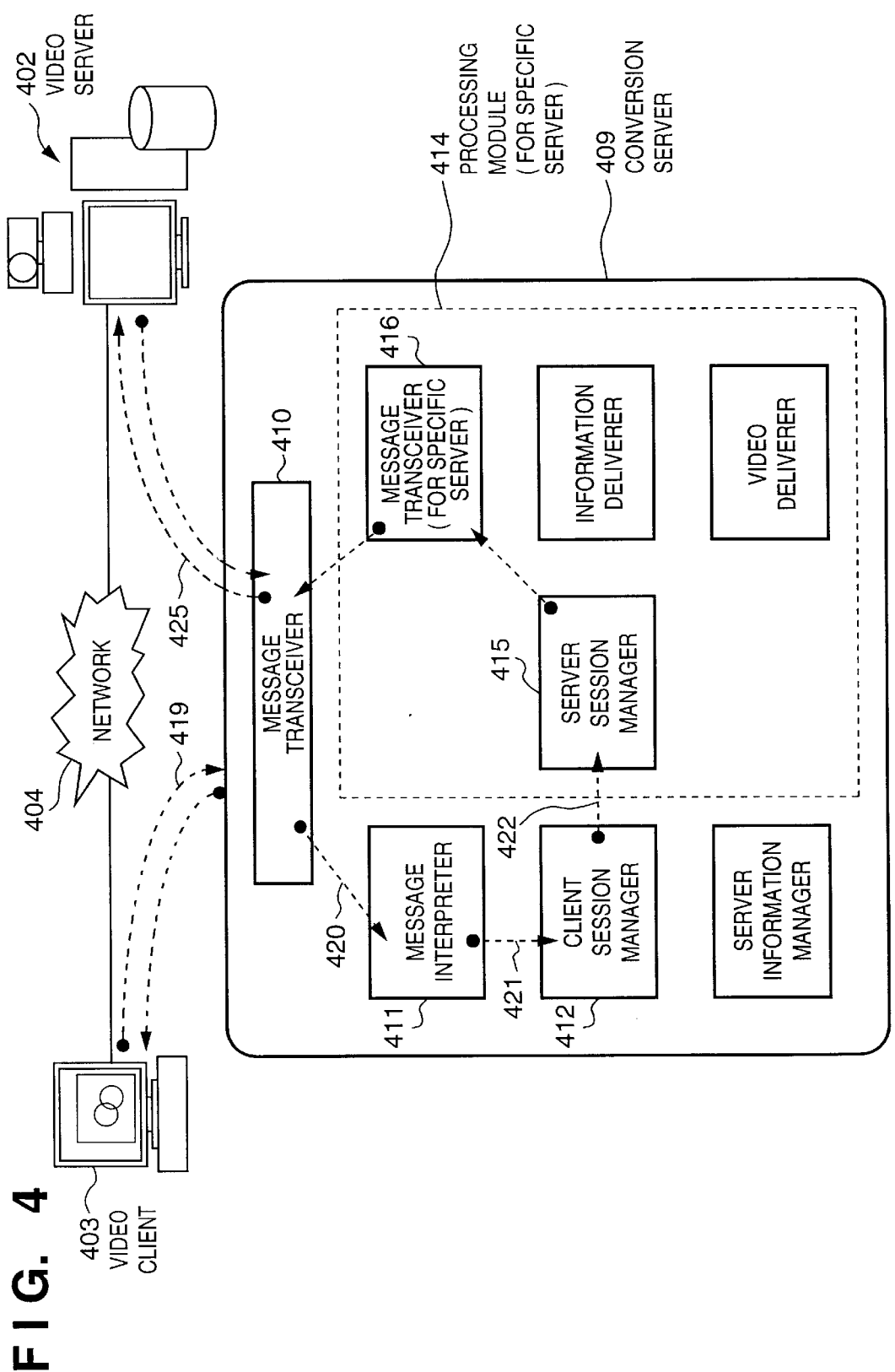
FIG. 4 is a block diagram explaining the operation of session terminating processing according to the first embodiment.
Figure 8:
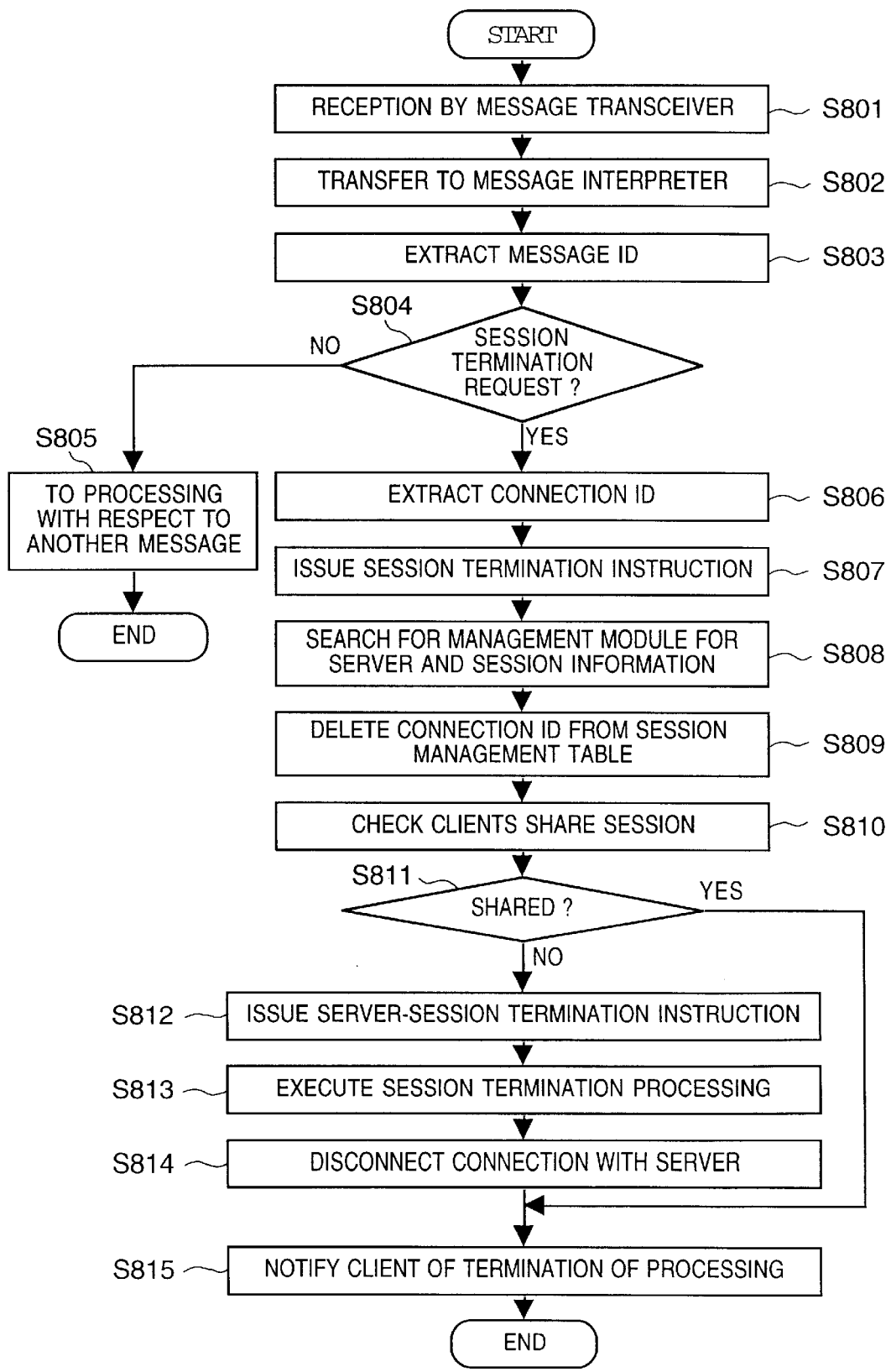
FIG. 8 is a flowchart showing the operation of the session terminating processing according to the second embodiment.

Next, the session termination processing will be described with reference to FIGS. 4 and 8.

When a video client 403 issues a session termination request (CloseCameraServer, 419), and a message transceiver 410 receives the request (step S801), the received request is transferred to a message interpreter 411 (step S802). The message interpreter 411 extracts a message ID from the transferred session termination request (420). The message interpreter 411 compares the message name with the message names of the respective requests, and determines what request has been transmitted (step S803). As a result, if the received request is not a session termination request (step S804), processing with respect to another request is performed (step S805).

If the received request is a session termination request (step S804), a connection ID added as a parameter to the session termination request is extracted (step S806).

Next, the message interpreter 411 issues a session termination instruction (421) to a client session manager 412 (step S807). The client session manager 412 receives the instruction (421), and extracts session information from its own management table with the connection ID as a key (step S808). Then, the client session manager 412 deletes the entry from the management table (step S809).

Then, the client session manager 412 examines how many entries with connection ID's having the value of the session information extracted at step S808 are registered in the management table (step S810). The examination may be made by counting the number of registered entries of the same session information by searching the table values, or by managing a reference count with server session information. In any case, if the session information other than the deleted entry with the connection ID (step S811) are referred to, the client session manager 412 notifies the video client (403) of the completion of the session termination processing by using the message transceiver 410 (step S815) since further processing is not necessary.

Further, if the session information is not shared by other video client(s) (step S811), the client session manager 412 issues a server-session termination instruction (422) to a server session manager 415 (step S812). The server session manager 415 performs server-session termination processing including transmission of a session termination request (425) to a video server 402 (step S813) via a transceiver 416 for the video server 402. Finally, the server session manager 415 disconnects the connection with the video server 402, and notifies the video client 403 of the completion of the processing (step S815).

Thus, the session termination processing is completed.

3. Acquisition of Video Data

Next, video acquisition processing will be described with reference to FIGS. 5 and 9.

When a video client 503 issues a video acquisition request (GetLiveImage, 519), and a message transceiver 510 receives the request (step S901), the received request is transferred to a message interpreter 511 (step S902). The message interpreter 511 extracts a message ID from the transferred video acquisition request (510) (step S903). The message interpreter 511 compares the message name with message names of the respective requests to check what request has been transmitted (step S903). As a result, if the received request is not a video acquisition request (step S904), processing with respect to another processing is performed (step S905).

If the received request is a video acquisition request (step S904), a connection ID added as a parameter to the request is extracted (step S906). Next, the message interpreter 511 issues a video acquisition instruction (521) to a client session manager 512 (step S907). The client session manager 512 receives the instruction (521), and extracts server session information from its management table with the connection ID as a key (step S908). Further, the client session manager 512 transfers the video acquisition instruction (522) to a video deliverer 517 (step S909).

The video deliverer 517 first examines its video data buffer managed by the video deliver 517 itself to determine whether or not the latest video data is held there. In the present embodiment, sequential numbers are allotted to the respective video data for the above examination. That is, each time video data is registered in the buffer, a number is allotted to the data. Further, the number of referred video data is managed for each video client with session information in the management table of the client session manager 512. If video data with a number greater than that of video data last referred to for the client is registered in the buffer, the video image can be regarded as the latest video image.

If it is determined as a result of the examination of the buffer that the content of the buffer is the latest video image (step S910), the video deliverer 517 returns the video data in the buffer to the video client 503 via the message transceiver 510 (step S914). If the number allotted to the video data in the buffer is the same as that of the last referred video data, it is determined that the content of the buffer is not the latest (step S910). Then, the video deliverer 517 performs video acquisition processing including sending a video acquisition request 525 to a video server 502 via a message transceiver 516 for the video server 502 (step S911). When the latest video data is obtained from the video server 502 (step S912), the video deliverer 517 rewritten the content of the buffer with the new video data (step S913), and returns the video data in the buffer via the message transceiver 510 to the video client 503 (step S914).

Thus, the video acquisition processing is completed. In the present embodiment, a number is allotted to the video data, and further, the number of video data last referred to for each client is stored. By this arrangement, regarding a client which operates at the highest speed, as the number of video data in the buffer coincides with that of last referred video data, the video data in the buffer is updated. That is, the video data in the buffer is updated by the fastest client. Further, regarding other slower clients, as the number of last referred video data is less than that of video data in the buffer, the video data in the buffer is returned to those clients.

4. Acquisition of Information

Figure 5:
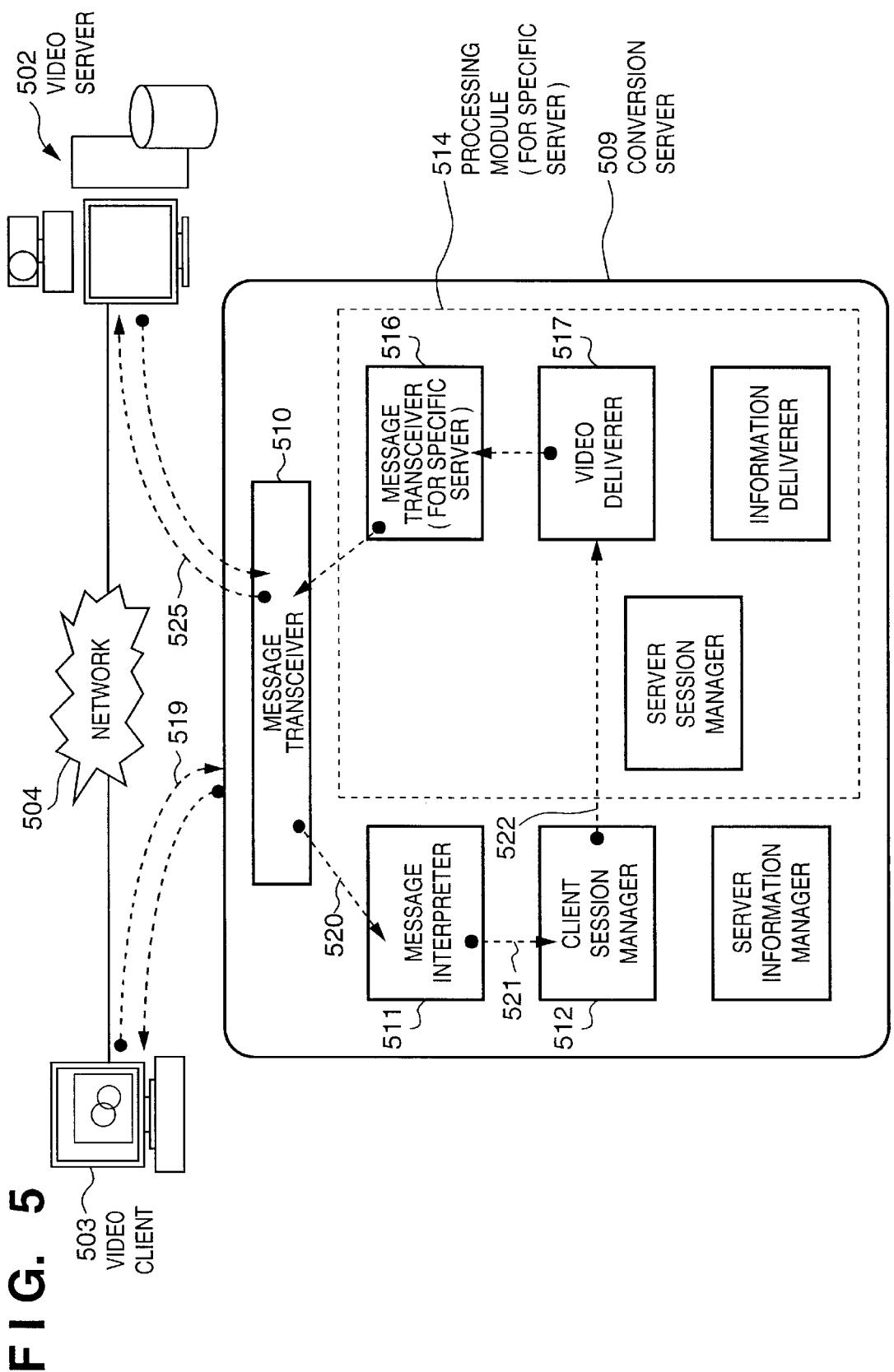
FIG. 5 is a block diagram explaining the operation of video acquisition processing according to the first embodiment.

Information acquisition processing is realized by performing processing, similar to the video acquisition processing by the video deliverer in FIG. 5, by an information deliverer. Similar to the management of video data, the latest information is managed in a buffer of the information deliverer, so that the number of communications with a video server can be reduced.

5. Camera Operation

In the internal processing in the conversion server, to operate a camera, a request (camera operation request) is transmitted and information on the status of the camera is returned. Therefore, the camera operation can be handled by the same method as that for the information acquisition.

As described above, the conversion server of the present invention includes:

a message transceiver between a video client and a video server a message transceiver for a specific video server a client session manager for managing connection with a video client a video deliverer for obtaining video data from a video server and delivering the video data to a plurality of video client an information deliverer for obtaining various information from a video server and delivering the information to a plurality of video clients a server information manager for changing a method for issuing a request message and a reply in accordance with a video server a server session manager for executing issuance of a request message and a reply in correspondence with a video server Accordingly, the present embodiment utilizing the HTTP protocol as a protocol between a conversion server and the video client provides video service to even a video client protected by a fire-wall system in a network.

Further, in the present embodiment, by utilizing the HTTP GET commands in a protocol between the conversion server and the video client, a video client can obtain and display video data without extending a Web browser.

Second Embodiment

Next, a second embodiment will be described as an example where the group of substitutional execution means and the group of efficiency improvement means in the above first embodiment are realized as a server independent of the group of switching means. More specifically, the processing module for a specific server in the same server program in the first embodiment is realized as a server program independent of the conversion server. This server as the processing module will be referred to as a "subconversion server".

First, the operation of the second embodiment will be described with reference to FIG. 10. In FIG. 10, video servers 1001 to 1003 and video clients 1004 to 1006 are interconnected via a network 1007, similar to the video servers and video clients in FIG. 2. However, the second embodiment provides a plurality of conversion servers 1008 to 1010, and a plurality of subconversion servers 1011 to 1013, respectively connected to the network 1007. The video clients 1004 to 1006 perform communication with the conversion servers 1008 to 1010, and the video servers 1001 to 1003 establish sessions with the subconversion servers 1011 to 1013.

In the second embodiment, even though the plurality of conversion servers are provided, the subconversion servers may be provided in correspondence with the types of video servers. For example, in a case where the subconversion server 1011 for the video server 1001 operates, the subconversion server 1011 can be commonly used by the conversion servers 1008 to 1010 for communication with the video server 1001. Further, as the video client can use any of the conversion servers 1008 to 1010, the video client can select the most convenient conversion server in correspondence with the status of the network 1007 and the like.

Figure 6:
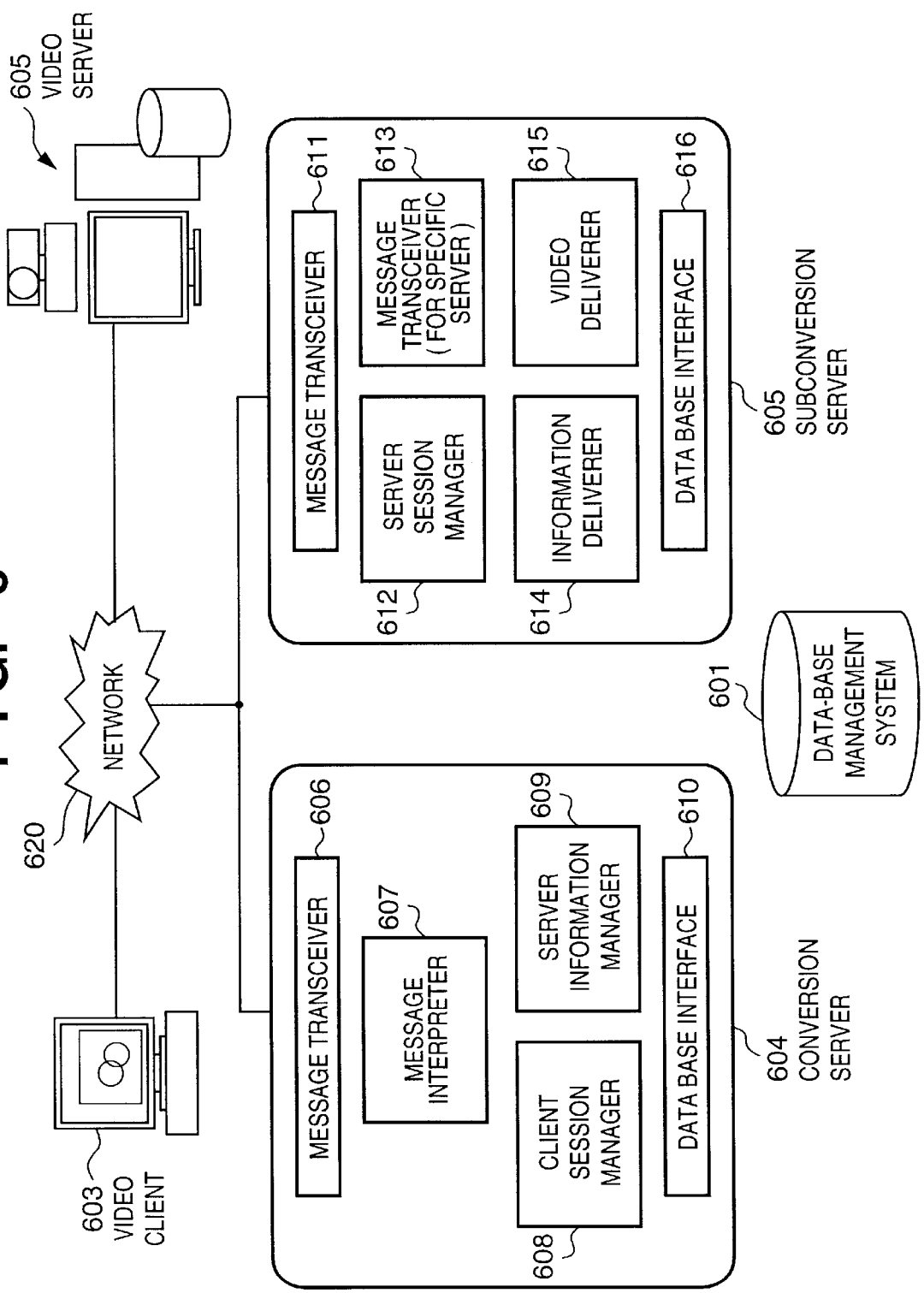
FIG. 6 is a block diagram showing the construction of the system according to a second embodiment of the present invention.

Next, the respective elements of the second embodiment will be described with reference to FIG. 6. In FIG. 6, the CPU and the main memory in FIG. 1 are omitted, however, the elements of the present embodiment operate on a computer (including a general-purpose device such as a personal computer), therefore, description will be made on the premise that a CPU, a main memory, a bus, a secondary storage device such as a hard disk are also provided in the present embodiment. Further, FIG. 6 only shows one video client 603 and one video server 602 connected via a network 620, however, actually, a plurality of video clients and video servers are connected to the network 620, as described in FIG. 1.

The respective elements of the second embodiment divide into a conversion server 604 and a subconversion server 605. The number of these servers may be increased as shown in FIG. 10.

First, the conversion server 604 has the following modules:

- a message transceiver 606
- a message interpreter 607
- a client session manager 608
- a server information manager 609
- a data base interface 610

The modules 606 to 609 play the same roles and perform the same operations as those of the corresponding modules in FIG. 1. The data base interface 610 added to the construction of the present embodiment is a relational data base to utilize the function of a data-base management system 601. Note that the data base is of any type in the present embodiment.

For example, the second embodiment can be realized by using an object-oriented data base as the data-base management system 601. In the client session manager and the server information manager of the first embodiment, the management of connection ID or the like is realized by using an internal table. On the other hand, data management and search functions of the second embodiment are provided by the data-base management system 601.

Further, the server manager of the first embodiment manages entry points to processing modules for specific servers, while the server manager 609 of the second embodiment manages information such as host names, port numbers and sockets necessary for communication with the subconversion server.

Next, the subconversion server 605 will be described. The subconversion server 605 comprises the following modules:

- a message transceiver 611
- a server session manager 612
- a message transceiver 613 for a specific server
- an information deliverer 614
- a video deliverer 615
- a data base interface 616

The modules 612 to 615 play the same roles and perform the same operations as those of the corresponding modules in FIG. 1. Further, the message transceiver 611 is mainly used for communication with the conversion server 604. The message transceiver 611 has a function similar to that of the message transceiver 606 in the conversion server 604. Further, the subconversion server 605 has a data base interface 616. The contents of the buffers in the video deliverer and information deliverer are managed by the data-base management system 601, and shared by the plurality of subconversion servers and conversion servers.

As described above, many of the respective elements of the second embodiment have the same functions and the perform almost the same operations as those of the corresponding elements of the first embodiment.

Accordingly, only the difference in operation from the first embodiment will be described below.

1. Information managed by a table in the first embodiment is managed by a data base. Registration, deletion and search of data are executed by issuing a command to the data base interface.
2. A part of instruction executed within the conversion server is transmitted/received as a request message via the network.

More specifically, such parts of instruction are as follows.
The session generation instruction (324) and the reply to the instruction in FIG. 3.
The session termination instruction (422) and the reply to the instruction in FIG. 4.
The video acquisition instruction (522) and the replay to the instruction in FIG. 5.

In the above-described second embodiment, the conversion server provides

- a message transceiver between a video client and a video server
- a message transceiver for a specific server
- a client session manager for management of connection with a the video client
- a server information manager for switching the method of issuing a request message and a reply in accordance with a video server.

Further, the subconversion server provides

- a video deliverer to obtain video data from a video server and deliver the data to a plurality of video clients
- an information deliverer to obtain various information from a video server and deliver the information to a plurality of video clients
- a server session manager for execution of issuance of a request message and a reply in accordance with a video server.

Further, to realize the above respective modules by using the data-base management module, a data base interface is added to the conversion server and the subconversion server.

According to the second embodiment, 1) as the conversion server and the subconversion server are provided, even if a video server of a new type is added, the new video server can be utilized from all the conversion servers and video clients only by operating one subconversion server corresponding to the video server; and
2) as the data management is made by utilizing the database management system, various information and obtained video data are shared among the conversion servers and subconversion servers. By this arrangement, even if a trouble occurs to some conversion server or subconversion server, another server can operate for the server with the trouble.

As described above, according to the first and second embodiments, a remote video delivery system to serve a moving or still video image to a computer at a remote place via a computer network, provides message transmission/reception means for transmitting/receiving a message from another program
message interpretation means for interpreting the message
connection management means for managing connection with a client video delivery means for delivering obtained video data to a plurality of clients information delivery means for delivering obtained various information to a plurality of clients delivery method switching means for switching the method for issuing a request message and a reply in accordance with a video server delivery method execution means for executing issuance of a request message and a reply in accordance with a video server.

Accordingly, the system has the following advantages.

1) The difference in communication format between the video delivery system and the World Wide Web system can be absorbed.
2) The reduction in execution efficiency due to integration of the video client and a Web browser can be prevented.
3) The difference in video delivery method for each video server can be absorbed, and a general-purpose video client can be realized.

Note that as described above, in the first and second embodiments, the conversion server and the subconversion server require hardware for connection with the network, however, these servers can be realized by programs which run on general-purpose devices such as personal computers.

Accordingly, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Further, the stream information service of the present invention is applicable to any realtime information service handling operation data, audio data and the like.

As described above, according to the present invention, information transmission can be performed between a server which serves information by its own communication format and a client which receives service on a general network, with an efficient and simple construction.

As many apparently widely different embodiments of the present invention can be made without departing from the spirit and scope thereof, it is to be understood that the invention is not limited to the specific embodiments thereof except as defined in the appended claims.

What is claimed is:

1. A relay apparatus for delivering video stream information from a server to a plurality of clients via a network, said apparatus comprising:

message reception means for receiving a video request message from a first client;

message interpretation means for interpreting a video request message received by said message reception means;

connection management means for managing connection with the first client;

video delivering means for delivering obtained video stream to the first client which has requested the video request;

information delivering means for delivering information interpreted by said message interpretation means to the server; and a buffer unit for storing video stream information received from the server, wherein said video delivering means delivers video stream information stored in said buffer unit to the first client without starting a new connection between the first client and the server in case that another connection between a second client different from the first client and the server has been established.

2. A relay apparatus for delivering video stream data from a server to clients via a network, comprising:

a connection management device adapted to establish a connection to a server in response to a request from a first client, and to deliver video stream data to the first client, and a memory control device adapted to store the video stream data from the server in a memory, wherein said connection management device delivers the video stream data stored in said memory to the first client without starting a new connection between the first client and the server, in case that a connection between a second client different from the first client and the server has been established.

3. The apparatus according to claim 2, wherein the memory holds the latest video data as video stream data.

4. The apparatus according to claim 2, wherein video stream data is obtained by an image pickup apparatus connected to the server.

5. The apparatus according to claim 2, wherein a protocol between said relay apparatus and the clients is HTTP.

6. The apparatus according to claim 2, wherein said connection management device converts a first format of video stream data from the server to a second format for the clients.

7. A relaying method to deliver video stream data from a server to clients via a network, comprising:

establishing a connection between a first client and the server in response to a request from the first client, storing video stream data in a memory, and delivering the video stream data from the server to the first client, in case that a connection between a second client different from the first client and the server has not been established, and delivering the video stream data which has been stored in said memory without starting a new connection between the first client and the server, in case that the connection between the second client and the server has been established.

8. The method according to claim 7, wherein the memory holds the latest video data as video stream data.

9. The method according to claim 7, wherein the video stream data is obtained by an image pickup apparatus connected to the server.

10. The method according to claim 7, wherein a protocol between said relay apparatus and the clients is HTTP.

11. The method according to claim 7, further comprising the step of:

converting a first format of video stream data from the server to a second format for the clients.

12. A storage medium to store a computer program to execute a relaying method to deliver video stream data from a server to clients via a network, said computer program comprising the codes of:

establishing a connection between a first client and the server in response to a request from the first client, storing in a memory, and delivering video stream data from the server to the first client, in case that a connection between a second client different from the first client and the server has not been established, and delivering video stream data which has been stored in the memory without starting a new connection between the first client and the server, in case that the connection between the second client and the server has been established.

13. The storage medium according to claim 12, wherein the memory holds the latest video data as video stream data.

14. The storage medium according to claim 12, wherein video stream data is obtained by an image pickup apparatus connected to the server.

15. The storage medium according to claim 12, wherein a protocol between said relay apparatus and the clients is HTTP.

16. The storage medium according to claim 12, further comprising the code of:

converting a first format of video stream data from the server to a second format for the clients.

* * * * *

UNITED STATES PATENT AND TRADEMARK OFFICE
CERTIFICATE OF CORRECTION

PATENT NO. : 6,738,822 B2
DATED : May 18, 2004
INVENTOR(S) : Toshihiko Fukasawa et al.

It is certified that error appears in the above-identified patent and that said Letters Patent is hereby corrected as shown below:

Title page,
Item [*] Notice, please add -- This patent issued on a continued prosecution application filed under 37 CFR 1.53(d), and is subject to the twenty year patent term provisions of 35 U.S.C. 154(a)(2) --

Signed and Sealed this

Twenty-second Day of March, 2005

JON W. DUDAS
*Director of the United States Patent and Trademark Office*